(12) United States Patent
Cheng

(10) Patent No.: US 8,405,962 B2
(45) Date of Patent: Mar. 26, 2013

(54) ELECTRO-OPTICAL APPARATUS AND DISPLAY MODULE

(75) Inventor: Chi-Cheng Cheng, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 1253 days.

(21) Appl. No.: 12/194,548

(22) Filed: Aug. 20, 2008

(65) Prior Publication Data

US 2009/0295741 A1 Dec. 3, 2009

(30) Foreign Application Priority Data

Jun. 2, 2008 (TW) .................................. 97120451

(51) Int. Cl.
*G06F 1/16* (2006.01)
*H05K 5/02* (2006.01)
*G02F 1/1333* (2006.01)
*G06F 3/041* (2006.01)

(52) U.S. Cl. ................ 361/679.21; 361/679.4; 345/173; 349/58

(58) Field of Classification Search .......... 345/173–178; 361/679.21–679.3, 679.4–679.44, 679.58, 361/679.01–679.45; 349/56, 58–60
See application file for complete search history.

(56) References Cited

U.S. PATENT DOCUMENTS

| 6,771,327 | B2 | 8/2004 | Sekiguchi |
| 6,975,368 | B2 | 12/2005 | Lee |
| 7,110,247 | B2 * | 9/2006 | Kim et al. ................ 361/679.26 |
| 7,237,937 | B2 * | 7/2007 | Kawashima et al. ......... 362/602 |
| 7,463,314 | B2 | 12/2008 | Lee |
| 2004/0109104 | A1 | 6/2004 | Lee |
| 2005/0057527 | A1 | 3/2005 | Takenaka et al. |
| 2006/0012731 | A1 * | 1/2006 | Ishiwa et al. ................. 349/65 |
| 2006/0038933 | A1 * | 2/2006 | Hashimoto .................... 349/58 |
| 2006/0072050 | A1 | 4/2006 | Lee |
| 2006/0232915 | A1 * | 10/2006 | Chou et al. ................. 361/681 |

FOREIGN PATENT DOCUMENTS

| TW | 200409993 | 6/2004 |
| TW | I230573 | 4/2005 |
| TW | M274735 | 9/2005 |
| TW | 200602589 | 1/2006 |
| TW | M317033 | 8/2007 |
| TW | 200812807 | 3/2008 |

OTHER PUBLICATIONS

"Office Action of Taiwan Counterpart Application", issued on Jan. 17, 2012, p. 1-p. 6, in which the listed references were cited.

* cited by examiner

*Primary Examiner* — Amr Awad
*Assistant Examiner* — Stephen Bray
(74) *Attorney, Agent, or Firm* — Jianq Chyun IP Office

(57) ABSTRACT

An electro-optical apparatus including a display module and a touch panel is provided. The display module includes a body, at least a first positioning element, and at least a second positioning element. The body has a display surface and a bottom surface opposite to the display surface. The first positioning element and the second positioning element are connected to the body. The first positioning element is disposed on a first side of the body and the second positioning element is disposed on a second side of the body that is adjacent to the first side. The first positioning element and the second positioning element protrude from the display surface in a direction away from the bottom surface. The touch panel is disposed on the display surface of the body, and edges of the touch panel abut against the first positioning element and the second positioning element.

8 Claims, 9 Drawing Sheets

ELECTRO-OPTICAL APPARATUS AND DISPLAY MODULE

CROSS-REFERENCE TO RELATED APPLICATION

This application claims the priority benefit of Taiwan application serial no. 97120451, filed on Jun. 2, 2008. The entirety of the above-mentioned patent application is hereby incorporated by reference herein and made a part of this specification.

BACKGROUND OF THE INVENTION

1. Field of the Invention

The present invention generally relates to an electro-optical apparatus and a display module, and particularly, to an electro-optical apparatus and a display module that is apt to simplify the module assembly process.

2. Description of Related Art

Among various electro-optical apparatuses, the display is currently one of the most popular consumer electronics products. Along with increasing advance in display technology, the use of displays, especially the touch displays, improves the convenience of people's life. The image displayed on the touch displays can be directly touched by a user to perform various functions, thereby simplifying the user's operation.

In general, in assembly of a touch panel and a display module, an assembly fixture is required to position the touch panel and the display module, firstly, and then the touch panel is joined to the display module, as described below.

Firstly, a body of the assembly fixture and the display module are provided, with the display module disposed in the body of the assembly fixture. The body of the assembly fixture has a first recess such that the display module can be positioned in the body of the assembly fixture by engaging in the first recess. The first recess is sized to fit the display module.

Next, an upper cover of the assembly fixture is provided as a reference object for subsequent alignment. The upper cover of the assembly fixture is disposed in a second recess in the body of the assembly fixture, with an inner edge of the upper cover of the assembly fixture being coplanar with an edge of the display module.

Next, a touch panel is provided and the touch panel is aligned by abutting against the inner edge of the upper cover of the assembly fixture, such that the display module and the touch panel can be closely contacted and attached. As a result, the display panel and the touch panel are assembled into a touch display. Finally, the body and the upper cover of the assembly fixture are removed to achieve the touch display.

From the above description, it can be seen that the extra assembly fixture, for example, the body and the upper cover as disclosed herein, is required in order for the touch panel and the display module to be successfully aligned and closely contacted. In addition, a complicated assembly process including at least the assembly process as described above, is required in order for the touch panel and display module to be aligned and closely contacted. More specifically, the size of the assembly fixture must change with the size of the touch display and, therefore, each type of touch display with a particular size must be assembled using a dedicated assembly fixture. In other words, if the size of the assembly fixture and the size of the touch panel are not matched, the display module and the touch panel may not be aligned or closely contacted, which would increase complexity of the assembly process. Therefore, a way of joining the touch panel and the display module that can overcome at least one of the above-identified shortcomings is needed.

SUMMARY OF THE INVENTION

Accordingly, the present invention is directed to an electro-optical apparatus which is designed to reduce the cost and simplify the module assembly process.

The present invention is also directed to a display module including a first positioning element and a second positioning element that can facilitate reducing the complexity of the module assembly process.

The present invention provides an electro-optical apparatus that includes a display module and a touch panel. The display module comprises a body, at least a first positioning element, and at least a second positioning element. The body has a display surface and a bottom surface opposite to the display surface. The first positioning element and the second positioning element are connected to the body, with the first positioning element located on a first side of the body and the second positioning element located on a second side of the body that is adjacent to the first side. The first positioning element and the second positioning element protrude from the display surface in a direction away from the bottom surface. The touch panel is disposed on the display surface of the body, and edges of the touch panel abut against the first positioning element and the second positioning element.

The present invention further provides a display module that comprises a body, at least a first positioning element and at least a second positioning element. The body comprises a display surface and a bottom surface opposite to the display surface. The first positioning element and the second positioning element are connected to the body with the first positioning element located on a first side of the body and the second positioning element located on a second side of the body that is adjacent to the first side. The first positioning element and the second positioning element protrude from the display surface in a direction away from the bottom surface.

According to one embodiment of the present invention, the first positioning element and the second positioning element are connected to form an L-shaped configuration.

According to one embodiment of the present invention, the body comprises a display panel and a frame, the display panel is disposed in the frame, and the first positioning element and the second positioning element are connected to the frame.

According to one embodiment of the present invention, the display panel is a liquid crystal display panel, and the body further comprises a backlight module. The liquid crystal display panel is located between the backlight module, the first positioning element and the second positioning element. The liquid crystal display panel and the backlight module are disposed within the frame. In one embodiment, the frame comprises a back frame part and a front frame part. The liquid crystal display panel and the backlight module are sandwiched between the back frame part and the front frame part with a portion of the liquid crystal display panel being exposed by the front frame part. In another embodiment, the first positioning element and the second positioning element may be integrally formed with the front frame part. In still another embodiment, the first positioning element and the second positioning element may be integrally formed with the back frame part.

According to one embodiment of the present invention, the electro-optical apparatus further comprises an adhesive means disposed between the display module and the touch panel to attach the touch panel and the display module.

According to one embodiment of the present invention, a length of the first positioning element is less than or equal to a length of the first side. In another embodiment, a length of the second positioning element is less than or equal to a length of the second side.

In the present invention, the electro-optical apparatus and the display module are provided with the first positioning element and the second positioning element that can be used as reference objects for aligning the display module with the touch panel. The design of the present invention is conducive to reduce the time-consuming and simplify the procedure for fabrication of the electro-optical apparatus, thereby reducing the cost for the module assembly process.

In order to make the aforementioned and other features and advantages of the present invention more comprehensible, embodiments accompanied with figures are described in detail below.

DESCRIPTION OF THE EMBODIMENTS

Figure 1:
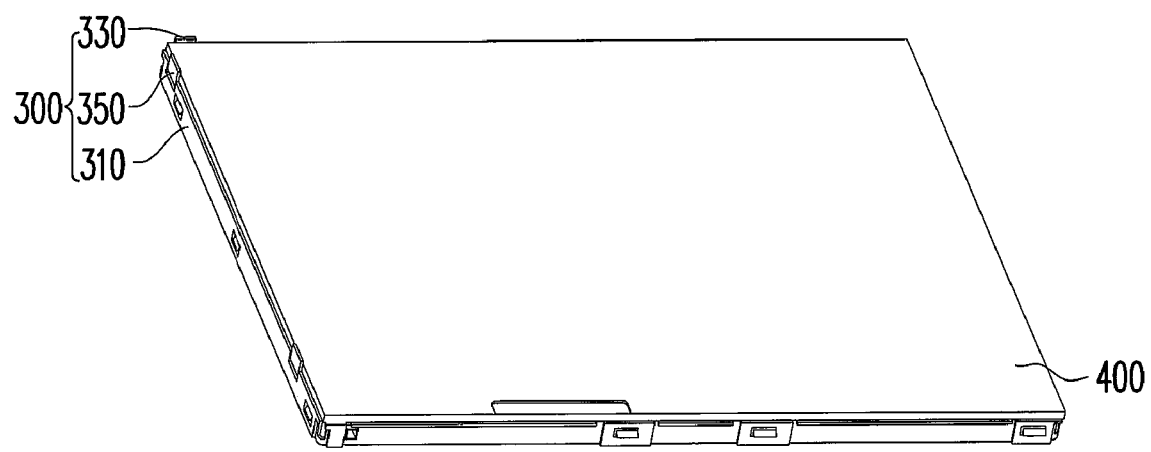
FIG. 1 is a schematic view of an electro-optical apparatus according to one embodiment of the present invention.
Figure 2A:
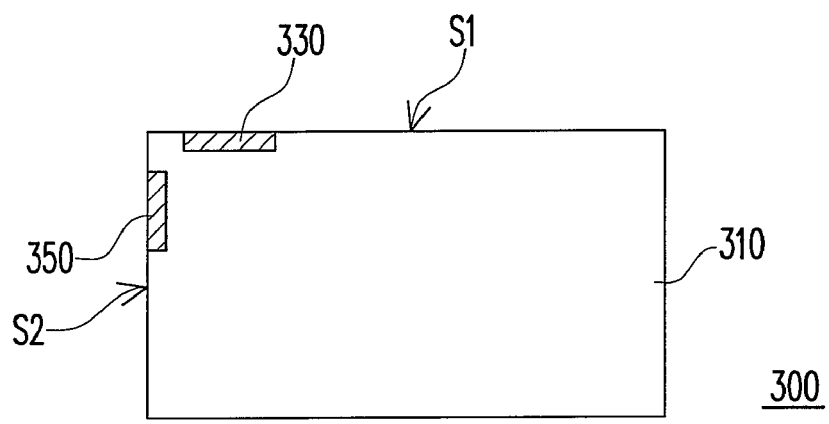
FIG. 2A is a top view of the display module of FIG. 1.

FIG. 1 is a schematic view of an electro-optical apparatus according to one embodiment of the present invention. The electro-optical apparatus 200 of this embodiment includes a display module 300 and a touch panel 400. FIG. 2A is a top view of the display module of FIG. 1. Referring to FIGS. 1 and 2A, the display module 300 of this embodiment includes a body 310, at least one first positioning element 330, and at least one second positioning element 350. While only one first positioning element 330 and one second positioning element 350 are shown in FIGS. 1 and 2A, it is to be understood that the number of the first positioning element 330 and the second positioning element 350 should not be limited to one in the present invention and it could be more than one.

It is noted that, for ease of description, the figures only illustrate the body 310, first positioning element 330 and second positioning element 350 of the display module 300 without showing other components (e.g., flexible printed circuit (FPC), etc.). The location and function of the omitted components should be well known to those skilled in the art and thus are not described one by one herein.

As shown in FIG. 1, when the user touches the touch panel 400, the electro-optical apparatus 200 can determine the location of the touched area of the touch panel 400 and thereby enable the display module 300 to display a specific image. That is, the touched area of the touch panel 400 and the image displayed on the display module 300 are highly correlated. As a result, in the conventional module assembly process, the assembly fixture is required for exactly positioning. However, the conventional assembly fixture usually cannot be commonly used with other module assembly processes, thus resulting in a high cost and sophisticated procedure of the module assembly process. Therefore, the embodiments illustrated herein propose to achieve an accurate alignment of the touch panel 400 with the display module 300 by making edges of the touch panel 400 abut against the first positioning element 330 and the second positioning element 350, which can simplify the procedure of the module assembly process.

As shown in FIG. 2A, the first positioning element 330 is positioned on a first side S1 of the body 310, and the second positioning element 350 is positioned on a second side S2 of the body 310 adjacent to the first side S1. Because the first side S1 and the second side S2 are adjacent to each other, the first positioning element 330 and the second positioning element 350 can cooperatively define a shape corresponding to one corner of the display module 300. When edges of the touch panel 400 abut against the first positioning element 330 and the second positioning element 350, the first positioning element 330 and the second positioning element 350 can restrain the touch panel 400 such that the touch panel 400 can be aligned with one corner of the display module 300.

If the first positioning element 330 and the second positioning element 350 are respectively disposed on opposite sides of the display module 300, the touch panel 400 is prone to slide in a direction parallel to the first positioning element 330 and the second positioning element 350, in which case the touch panel 400 and the display module 300 could be misaligned. It is noted that, in the illustrated embodiment, the first positioning element 330 and the second positioning element 350 are disposed on two adjacent sides of the display module 300 such that the touch panel 400 can be disposed at a correct location.

Figure 2B:
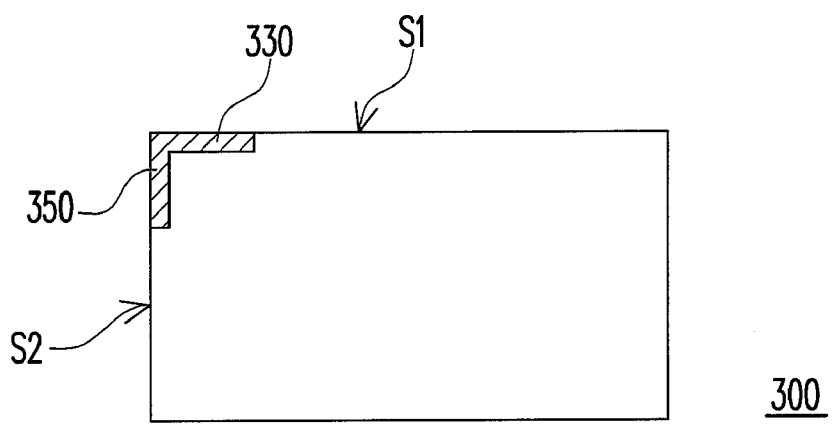
FIGS. 2B through 2E illustrate four examples of positional relationship between the first positioning element and the second positioning element of the display module.

It is to be understood that there is no limitation as to the location of the first positioning element 330 on the first side S1 and the location of the second positioning element 350 on the second side S2. In other words, the first positioning element 330 may be disposed anywhere on the first side S1 and the second positioning element 350 may be disposed anywhere on the second side S2. FIGS. 2B through 2E give four examples of positional relationship between the first positioning element and the second positioning element. Referring first to FIG. 2B, the first positioning element 330 is, for example, disposed on the first side S1 adjacent to the second side S2, and the second positioning element 350 is, for example, disposed on the second side S2 adjacent to the first side S1. In this case, the first positioning element 330 and the second positioning element 350 are respectively disposed on the first side S1 and the second side S2 such that they are connected to form an L-shaped configuration.

In an alternative embodiment, the first positioning element 330 may be disposed on the first side S1 away from the second side S2, and the second positioning element 350 may be disposed on the second side S2 away from the first side S1. It is noted that the position of the first positioning element 330 on the first side S1 is determined independent of the position of the second positioning element 350 on the second side S2, and the position of the second positioning element 350 on the second side S2 is determined independent of the position of the first positioning element 330 on the first side S1. In other words, the above-described positions of the first positioning element 330 and the second positioning element 350 can be paired in various manners such that the first positioning element 330 and the second positioning element 350 are in a desired positional relationship.

Figure 2C:
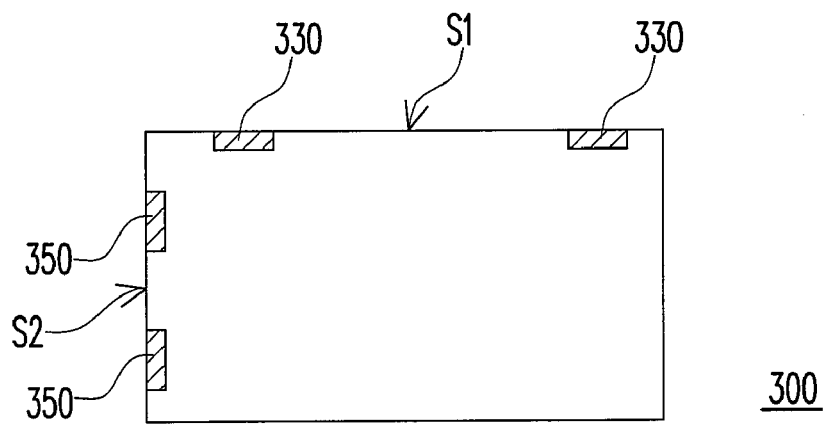
Figure 2D:
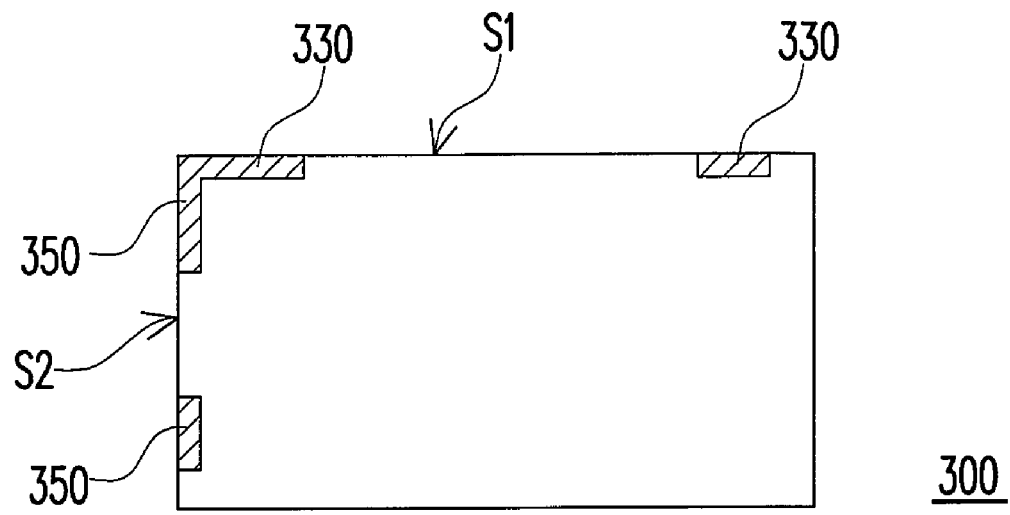

Referring to FIG. 2C, the display module 300 includes two first positioning elements 330 and two second positioning elements 350. One of the first positioning elements 330 is disposed on the first side S1 away from the second side S1, while the other of the first positioning elements 330 is disposed to be relatively closer to the second side S2. Similarly, the second positioning elements 350 are disposed on the second side S2 with one being closer to the first side S1 than the other. Referring to FIG. 2D, in further another embodiment, one of the first positioning elements 330 and one of the second positioning elements 350 may be connected to form an L-shaped configuration.

Figure 2E:
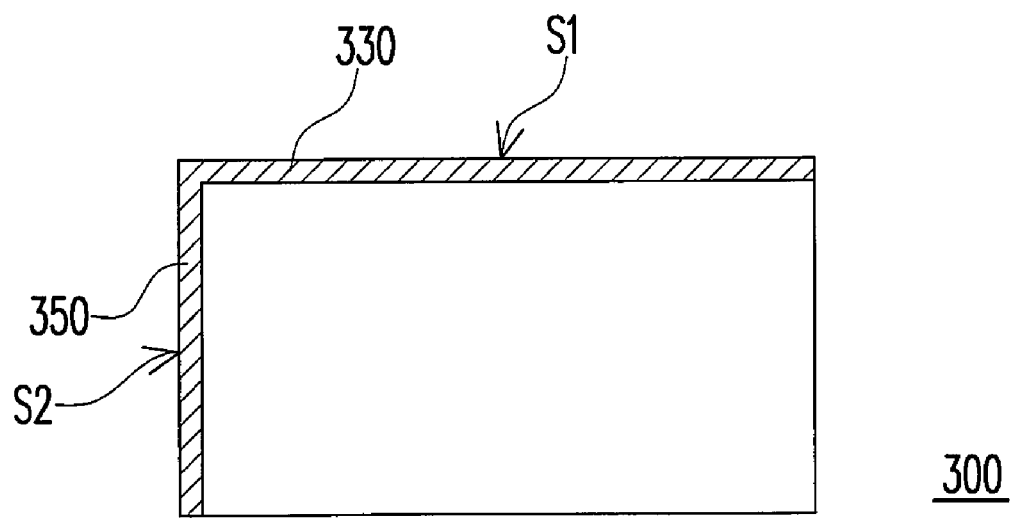

In the above-describe embodiments, the first positioning element 330 and the second positioning element 350 are less than the first side S1 and the second side S2 in length, respectively. In other embodiments, the length of the first positioning element 330 may be modified to be less than the length of the first side S1, or the length of the second positioning element 350 may be modified to be less than the length of the second side S2. That is, when the length of the first positioning element 330 is, for example, equal to the length of the first side S1, and the length of the second positioning element 350 is, for example, equal to the length of the second side S3, an L-shaped configuration is formed by the first positioning element 330 and the second positioning element 350 as illustrated in FIG. 2E.

Certainly, the positional relationship described above and combinations thereof may be appropriately modified according to actual requirements of the products. For example, the first positioning elements 330 are disposed anywhere on the first side S1 and a side opposite to the first side S1, and the second positioning elements 350 are disposed anywhere on the second side S2. Alternatively, the first positioning elements 330 are disposed anywhere on the first side S1 and the opposite side, and the second positioning elements 350 are disposed anywhere on the second side S2 and a side opposite to the second side S2. That is to say, for a rectangular display module 300, the positioning elements may be disposed on all or only three of the four sides of the display module 300.

The positional relationship has been described above by way of examples. However, the examples are not exhaustive. In other words, the first positioning element 330 and the second positioning element 350 can be disposed into another positional relationship. Furthermore, the number of the first positioning element 330 and the second positioning element 350 can be the same or not, and should not be limited to those describe above.

Figure 2F:
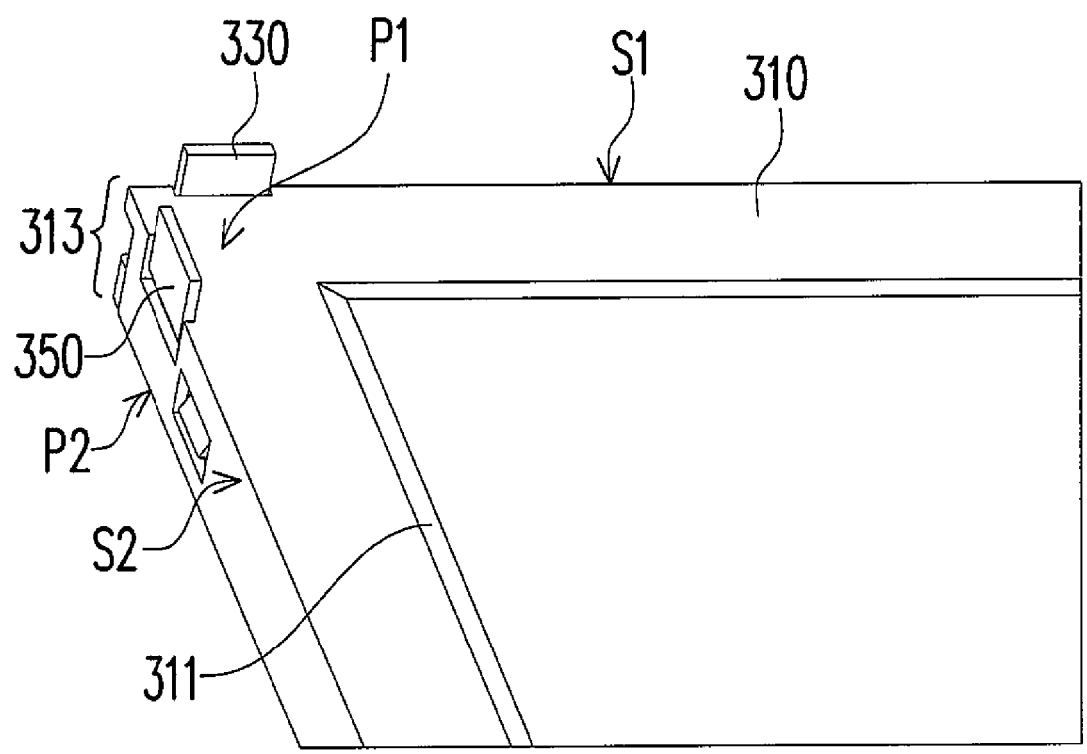
FIG. 2F is partial view of the display module of FIG. 1.

FIG. 2F is a partial view of the display module of FIG. 1. Referring to FIG. 2F, the body 310 of the display module 300 has a display surface P1 and a bottom surface P2 opposite to the display surface P1. The first positioning element 330 and the second positioning element 350 are connected to the body 310 and protrude from the display surface P1 in a direction away from the bottom surface P2. The body 310 also includes a display panel 311 and a frame 313 that receives the display panel 311 therein. The first positioning element 330 is connected to the frame 313, and the second positioning element 350 is also connected to the frame 313.

Figure 3A:
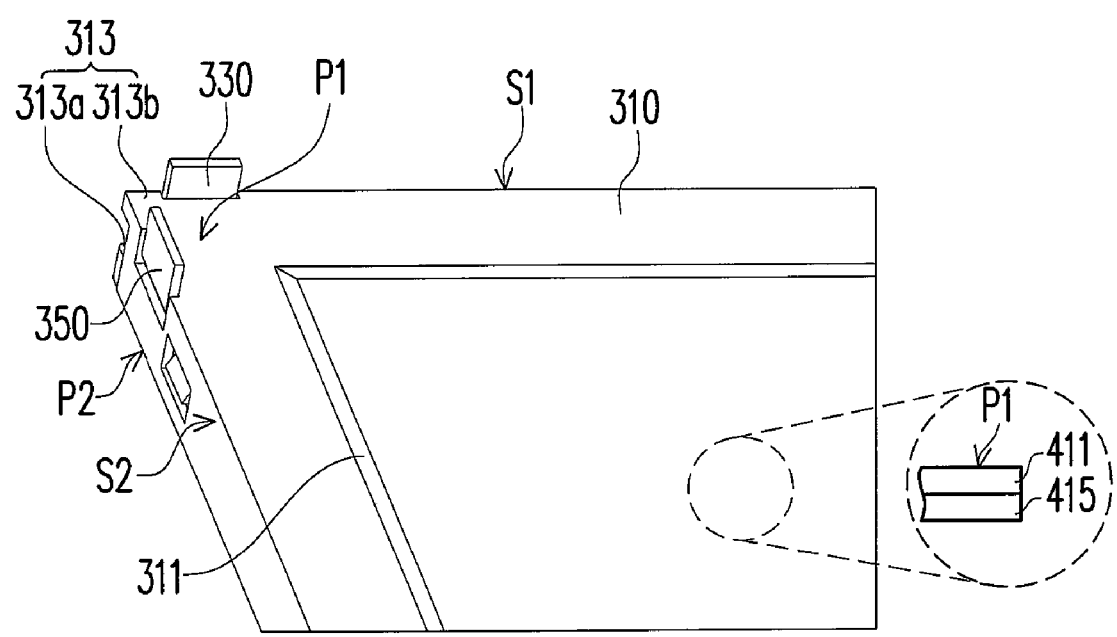
FIG. 3A is a partial view of the structure of the display module including a liquid crystal display panel according to one embodiment of the present invention.

The structure of one exemplary display module 300 is described below in which the display panel 311 is illustrated as a liquid crystal display panel. FIG. 3A is a partial view of a display module including a liquid crystal display panel according to one embodiment of the present invention. Referring to FIG. 3A, the body 310 of the display module 300 of the illustrated embodiment includes at least one liquid crystal display panel 411 and a backlight module 415. It is noted that the liquid crystal display panel 411 cannot emit light by itself and, therefore, the illustrated embodiment employs the backlight module 415 to provide the light for the liquid crystal display panel 411. In addition, the backlight module 415 cannot be observed in the perspective view of the display module because it is substantially enclosed by other components. As such, the relative positional relationship between the liquid crystal display panel 411 and the backlight module 415 is additionally illustrated in a partial cross-sectional view.

As shown in FIG. 3A, the liquid crystal display panel 411 and the backlight module 415 are disposed within the frame 313, and the liquid crystal display panel 411 is disposed between the backlight module 415, the first positioning element 330, and the second positioning element 350. The frame 313 includes a back frame part 313a and a front frame part 313b, and the liquid crystal display panel 411 and the backlight module 415 are sandwiched between the back frame part 313a and the front frame part 313b. In addition, the front frame part 313b is configured to expose a portion of the liquid crystal display panel 411, such that the image displayed by the display module 300 can be seen through the exposed portion of the liquid crystal display panel 411.

Figure 3B:
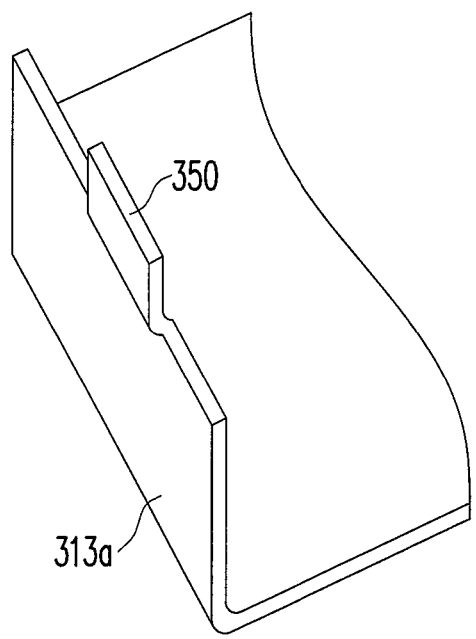
FIG. 3B is a partial view of the back frame part of FIG. 3A.

It is noted that the first positioning element 330 and the second positioning element 350 of FIG. 3A are, for example, integrally formed with the back frame part 313a. FIG. 3B is a partial view of the back frame part of FIG. 3A. Referring to FIG. 3B, taking the second positioning element 350 as an example, the second positioning element 350 may extend from the back frame part 313a.

Figure 3C:
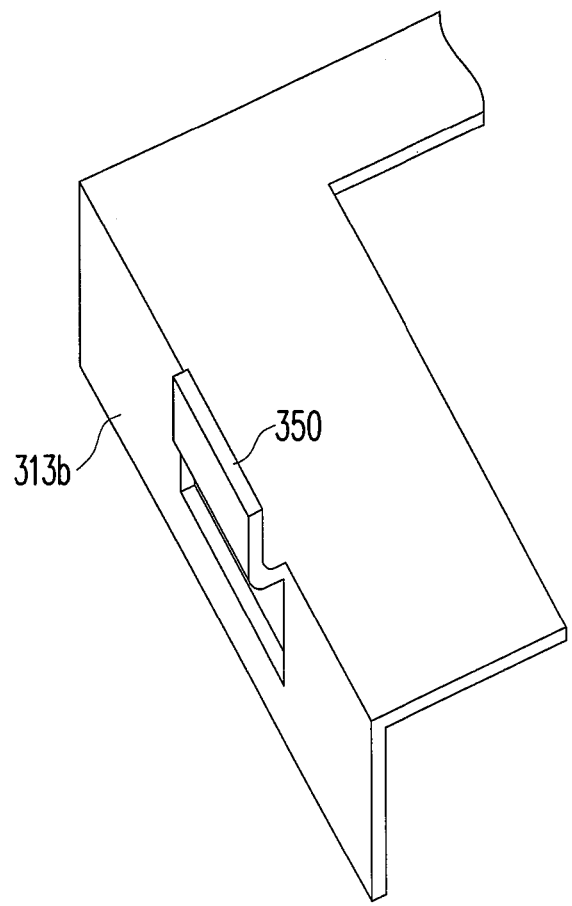
FIG. 3C is a partial view of the front frame part according to another embodiment of the present invention.

Certainly, in an alternative embodiment, the first positioning element 330 and the second positioning element 350 may be integrally formed with the front frame part 313b. FIG. 3C is a partial view of the front frame part according to another embodiment of the present invention. Referring to FIG. 3C, taking the second positioning element 350 as an example, the second positioning element 350 may extend from the front frame part 313b.

In still another embodiment, the first positioning element 330 and the second positioning element 350 may be integrally formed with the back frame part 313a and the front frame part 313b, respectively. Alternatively, the first positioning element 330 and the second positioning element 350 may be integrally formed with the front frame part 313b and the back frame part 313a, respectively. In yet another embodiment, a part of the first positioning element 330 (or second positioning element 350) is integrally formed with the back frame part 313a, and a part of the first positioning element 330 (or second positioning element 350) is integrally formed with the front frame part 313b.

Referring to FIGS. 1 and 3A, with the provision of the first positioning element 330 and the second positioning element 350 of the display module 300, edges of the touch panel 400 can abut against the first positioning element 330 and the second positioning element 350, such that the touch panel 400 can be accurately disposed relative to the display module 300. In other words, once two adjacent edges of the touch panel 400 are closely contacted with the first positioning element 330 and the second positioning element 350, the touch panel 400 can be correctly positioned relative to the display module 300. In practice, the electro-optical apparatus 200 further includes an adhesive means (not shown) for attaching the touch panel 400 and the display module 300. An exemplary process of attaching the touch panel 400 and the display module 300 is described as follows.

Figure 4A:
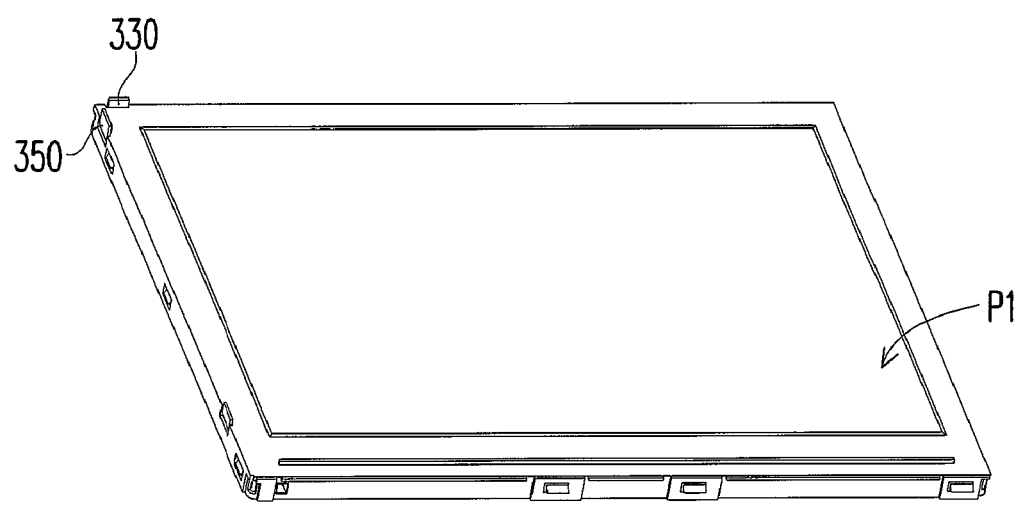
FIGS. 4A through 4C illustrate the procedure of aligning and joining of the touch panel and the display module according to one embodiment of the present invention.
Figure 4B:
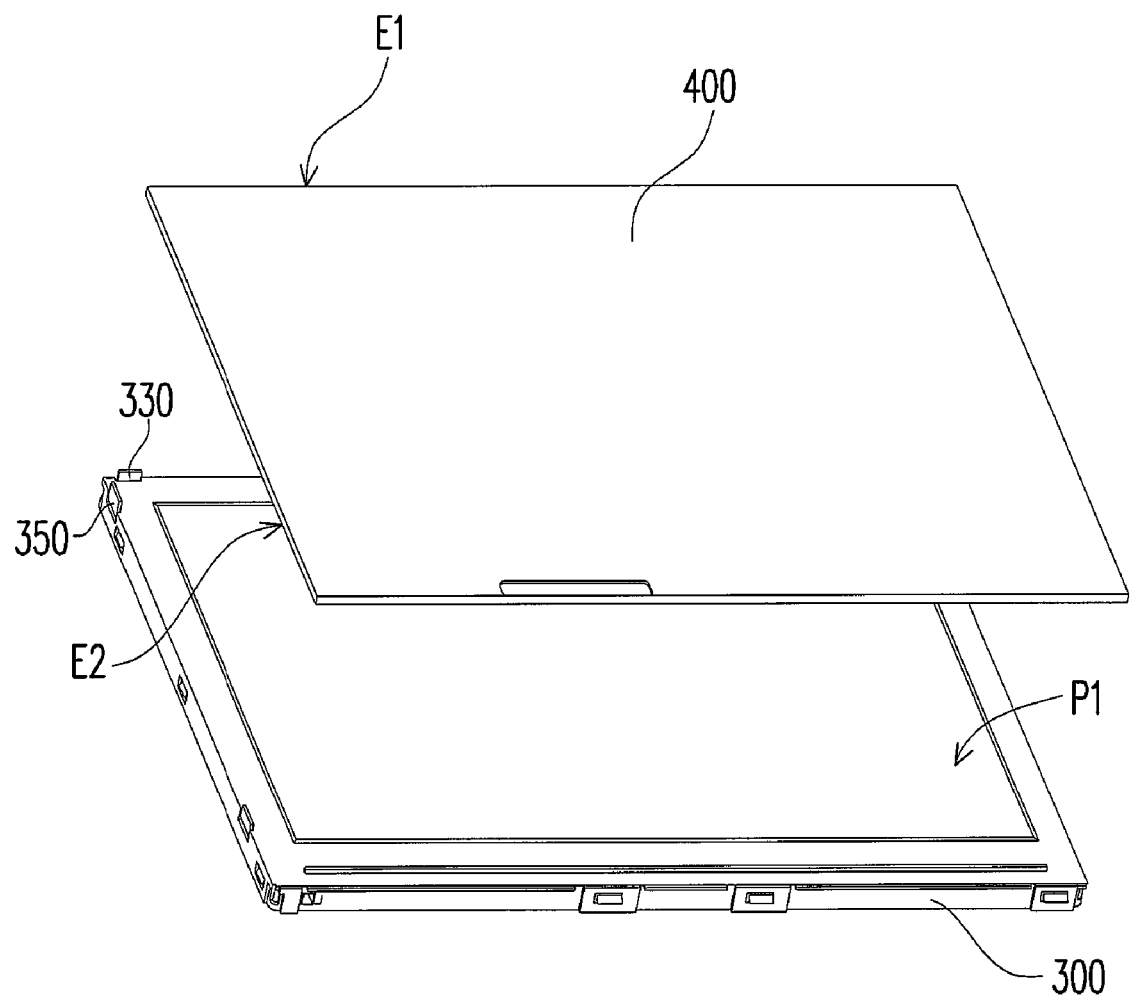
Figure 4C:
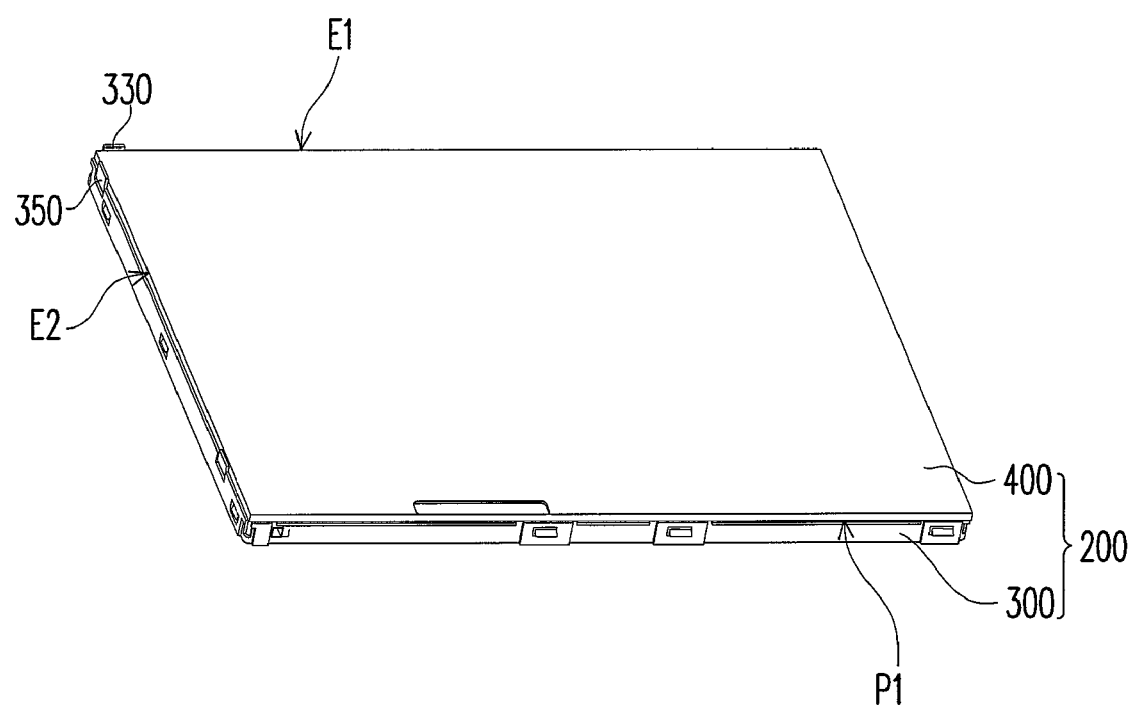

FIGS. 4A through 4C illustrate aligning and attaching procedure of the touch panel and the display module according to one embodiment of the present invention. Referring to FIG. 4A, first, a display module 300 including a first positioning element 330 and a second positioning element 350 is provided. In this illustrated embodiment, the display module 300 is, for example, horizontally placed with a display surface P1 facing upward.

Next, referring to FIG. 4B, a touch panel 400 is provided. The touch panel 400 is made into alignment with the display module 300, with the touch panel 400 and the display surface P1 facing each other. In addition, a first edge E1 of the touch panel 400 corresponds to the first positioning element 330, and a second edge E2 of the touch panel 400 corresponds to the second positioning element 350. The first edge E1 is adjacent to the second edge E2.

Afterwards, referring to FIG. 4C, the touch panel 400 is disposed on the display module 300 by disposing the touch panel 400 into contact with the first positioning element 330 and the second positioning element 350. More specifically, the first edge E1 abuts against the first positioning element 330, and the second edge E2 abuts against the second positioning element 350, such that the touch panel 400 can be accurately disposed on the display surface P1 of the display module 300. Subsequently, the touch panel 400 is attached to the display module 300 using the adhesive means. As the touch panel 400 and the display panel 300 are attached, the touch panel 400 is disposed between the first positioning element 330, the second positioning element 350, and the display module 300, and the assembly of the electro-optical apparatus 200 formed by the touch panel 400 and the display module 300 is completed.

As describe above, the first positioning element 330 and the second positioning element 350 are disposed on two adjacent sides of the display module 300. Therefore, the touch panel 400 abuts against the first positioning element 330 and the second positioning element 350 thus avoiding the sliding movement of the touch panel 400. That is, the touch panel 400 can be disposed at the correct position. In the present invention, alignment and attachment of the touch panel 400 and the display module 300 requires no assembly fixture and extra equipments. Therefore, the touch panel 400 and the display module 300 of any size can be readily and correctly attached, thereby simplifying the process procedure and equipment requirements.

In summary, alignment and attachment of the touch panel and the display module conventionally requires the assembly fixture, which makes the assembly time-consuming and complicated. In addition, because the size of the assembly fixture changes with the size of the touch panel and the display module, the conventional assembly fixture of one particular size cannot be commonly used. Moreover, fabrication and maintenance of the conventional assembly fixture also increase the cost of the module assembly process. However, in the present invention, the first positioning element and the second positioning element, which are used as reference objects for alignment, are formed during the course of manufacturing the display module. Therefore, the present invention significantly simplifies the assembly procedure of the display module and the touch panel, and thus increases the assembly efficiency. In addition, the electro-optical apparatus of the present invention can be assembled without the use of any assembly fixture, thus cutting down the assembly fixture-related cost and hence reducing the cost of the module assembly process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electro-optical apparatus comprising:
a display module comprising a body, at least a first positioning element, and at least a second positioning element, the body comprising a frame and having a display surface and a bottom surface opposite to the display surface, the first positioning element and the second positioning element being connected to the body, the first positioning element being located on a first side of the body, the second positioning element being located on a second side of the body that is adjacent to the first side, and the first positioning element and the second positioning element protruding from the display surface in a direction away from the bottom surface, wherein the frame comprises a front frame part and a back frame part, at least a portion of the first positioning element or the second positioning element is integrally formed with the back frame part, and the front frame part has an opening corresponding to the first positioning element or the second positioning element integrally formed with the back frame part such that the first positioning element or the second positioning element integrally formed with the back frame part penetrates through the opening; and
a touch panel disposed on the display surface of the body and edges of the touch panel abutting against the sides of the first positioning element and the second positioning element.

2. The electro-optical apparatus according to claim 1, wherein the first positioning element and the second positioning element are connected to form an L-shaped configuration.

3. The electro-optical apparatus according to claim 1, wherein the body comprises a display panel, the display panel is disposed in the frame, and the first positioning element and the second positioning element are connected to the frame.

4. The electro-optical apparatus according to claim 3, wherein the display panel is a liquid crystal display panel, the body further comprises a backlight module, the liquid crystal display panel is located between the backlight module, the first positioning element and the second positioning element, and the liquid crystal display panel and the backlight module are disposed within the frame.

5. The electro-optical apparatus according to claim 4, wherein the liquid crystal display panel and the backlight module are sandwiched between the back frame part and the front frame part, with a portion of the liquid crystal display panel being exposed by the front frame part.

6. The electro-optical apparatus according to claim 1, further comprising an adhesive means disposed between the display module and the touch panel to attach the touch panel and the display module.

7. The electro-optical apparatus according to claim 1, wherein a length of the first positioning element is less than or equal to a length of the first side.

8. The electro-optical apparatus according to claim 1, wherein a length of the second positioning element is less than or equal to a length of the second side.

* * * * *